M. B. HOOD.
WAX CAKE.
APPLICATION FILED FEB. 20, 1905.

964,422.

Patented July 12, 1910.

Witnesses:
Walter E. Lombard
Marshall Underwood

Inventor:
Milton B. Hood,
by N. C. Lombard
Atty.

UNITED STATES PATENT OFFICE.

MILTON B. HOOD, OF MELROSE, MASSACHUSETTS.

WAX CAKE.

964,422. Specification of Letters Patent. Patented July 12, 1910.

Application filed February 20, 1905. Serial No. 246,424.

*To all whom it may concern:*

Be it known that I, MILTON B. HOOD, of Melrose, in the county of Middlesex and State of Massachusetts, have invented a new and useful Improvement in Wax Cakes for Family and Shop Use, of which the following, taken in connection with the accompanying drawings, is a specification.

My invention relates to the make up of cakes of wax and especially to cakes of bee's wax for family use, and it consists of a cake of wax composed of a plurality of sections of wax of different colors, firmly united in one cohesive mass whereby a single cake of wax will suffice for all the requirements of a lady's work basket.

Figure 1:
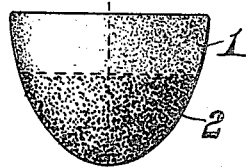
Figure 2:
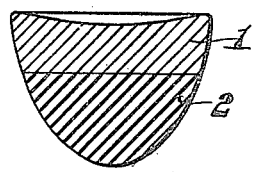

Figure 1 of the drawings is an elevation of a cake of wax composed of two sections of different colors and embodying my invention. Fig. 2 is a vertical sectional view of the same.

In the drawings, 1 represents a block or layer of wax of a particular color, and 2 a block or layer of wax of a different color, these two blocks or layers being cohesively united in a single mass.

The wax cake may have different finished form, but preferably is of the shape herein shown, in which the outer face of one section at one side is concaved and the section at the opposite side more globular in outline to facilitate the application of the wax to the thread. The concave layer 1 is of less thickness than the convexed layer 2, the block as a whole being of substantially conical form, the layer 1 forming the base and the layer 2 the apex of the cone. Each layer has a flat face, the flat faces of the layers abutting, the flat faces of the layers being of the same diameter in area, and the layers being cohesively secured together at said abutting flat faces.

What I claim as new and desire to secure by Letters Patent of the United States is:

A new article of manufacture, comprising a block formed of a multiple of differently-colored wax layers, said layers being provided with flat circular faces of the same diameter and being superposed and cohesively united in a single mass at said faces, one of said layers having a concaved outer face, and the opposite layer having a convexed outer face, the former layer being of less thickness than the latter and the concavity thereof being of less degree than the convexity of the latter layer, said block being of substantially conical form and the former layer forming the base and the latter layer the apex of the conical block.

In testimony whereof, I have signed my name to this specification in the presence of two subscribing witnesses, on this sixteenth day of February A. D. 1905.

MILTON B. HOOD.

Witnesses:
N. C. LOMBARD,
A. M. SOUTHACK.